US012756135B2

(12) United States Patent
Winter et al.

(10) Patent No.: US 12,756,135 B2
(45) Date of Patent: Oct. 6, 2026

(54) OUTER END CAP FOR SEALING AN ELECTRICAL CONNECTOR AS WELL AS CONNECTOR ASSEMBLY

(71) Applicant: Tyco Electronics Raychem GmbH, Ottobrunn (DE)

(72) Inventors: Axel Winter, Ottobrunn (DE); Torsten Friedrich, Ottbrunn (DE)

(73) Assignee: TE CONNECTIVITY ENERGY GmbH, Ottobrunn (DE)

( * ) Notice: Subject to any disclaimer, the term of this patent is extended or adjusted under 35 U.S.C. 154(b) by 192 days.

(21) Appl. No.: 18/467,777

(22) Filed: Sep. 15, 2023

(65) Prior Publication Data

US 2024/0097375 A1 Mar. 21, 2024

(30) Foreign Application Priority Data

Sep. 16, 2022 (EP) .................................... 22196198

(51) Int. Cl.
*H01R 13/52* (2006.01)

(52) U.S. Cl.
CPC ................................ *H01R 13/5202* (2013.01)

(58) Field of Classification Search
None
See application file for complete search history.

(56) References Cited

U.S. PATENT DOCUMENTS

2009/0245965 A1 10/2009 Siebens
2011/0136396 A1* 6/2011 Burwell ............... H02G 15/046
439/750
2013/0218242 A1 8/2013 Schomacker
2015/0245512 A1 8/2015 Xie et al.
2021/0044036 A1 2/2021 Watkins
2021/0278442 A1 9/2021 Wilson et al.
2022/0231451 A1 7/2022 Adili

FOREIGN PATENT DOCUMENTS

CN 103619698 A * 3/2014 ............. B62J 45/00
CN 114008883 A 2/2022
GB 1280014 A 7/1972
GB 1280041 A 7/1972
WO 2006058021 A2 6/2006
WO 2006058021 A3 6/2006
WO 2016173543 A1 11/2016

OTHER PUBLICATIONS

Extended European Search Report from the European Patent Office dated Mar. 1, 2023, corresponding to Application No. 22196198.0-1201, 58 pages.

* cited by examiner

*Primary Examiner* — Tho D Ta

(57) ABSTRACT

An outer end cap for sealing a connection end of an electrical connector includes a cover section covering an end face of the connection end and a collar section attached to the connection end. The cover section has a through-hole receiving a sensor cable of a sensor. The cover section and the collar section jointly form a receptacle receiving the connection end. An interior surface of the receptacle has a semi-conductive material. A connector seal is formed on the interior surface of the receptacle and a cable seal is formed in the through-hole.

19 Claims, 5 Drawing Sheets

OUTER END CAP FOR SEALING AN ELECTRICAL CONNECTOR AS WELL AS CONNECTOR ASSEMBLY

CROSS-REFERENCE TO RELATED APPLICATIONS

This application claims the benefit of the filing date under 35 U.S.C. § 119(a)-(d) of European Patent Application No. 22196198.0, filed on Sep. 16, 2022.

FIELD OF THE INVENTION

The present invention relates to an outer end cap for sealing a connection end of an electrical connector. Further, the present invention relates to a connector assembly with such an outer end cap.

BACKGROUND

In many technical fields, electrical connectors are provided for establishing electrical connections, which serve the purpose of transmitting electrical energy. In the case of energy transmission at a high-voltage (>42 kV) or medium voltage (1 kV-42 kV), which is common in applications such as power distribution, industry and railway, so called tee connectors (also known as T-connectors) are often used. In particular, these tee connectors are used for coupling an electrical unit of high-voltage (up to 72.5 kV) or medium voltage with another electrical unit via an electrical cable. Such an electrical unit could be e.g., a terminal of a power line, in particular of a power source, while the other electrical unit could be e.g., a transformer, switch gear or switch box.

Depending on the application, multiple electrical units can be coupled with a single electrical unit, by interconnecting multiple tee connectors in a back-to-back manner. For this purpose, each tee connector comprises two connection ends facing away from each other in opposite directions. One connection end is coupled to the single electrical unit. At the opposite connection end, a further tee connector can be coupled, while the electrical cable is attached to a middle section of the tee connector arranged between the two connection ends. Alternatively, the opposite connection end could be left accessible for installation, testing and grounding. The installation can take place by a threaded connection to a bushing. For the testing and grounding, special plugs are available to be used with the tee connectors, e.g. for commissioning tests and achieving a safe condition during construction work.

This gives the tee connectors their eponymous, characteristic structure in the shape of the capital letter "T". Such tee connectors are manufactured by TE Connectivity Ltd. for example under the product name "RSTI-68XY". The notation "XY" relates to the different configurations for cable cross-sections, grounding systems and country specific requirements. Further, certain aspects of tee connectors are standardized e.g., in IEEE Standard 386, EN Standard 50180, EN Standard 50181 and IEC Standard 60501-4.

Tee connectors are often used in places subject to a variety of environmental impacts. Further, the connectors frequently include elements for status monitoring or condition monitoring of system parameters or component parameters, respectively. There is a need for sensored tee connectors with improved protection against environmental hazards. At the same time, the tee connector should be accessible for further tee connectors without permanent obstruction.

SUMMARY

An outer end cap for sealing a connection end of an electrical connector includes a cover section covering an end face of the connection end and a collar section attached to the connection end. The cover section has a through-hole receiving a sensor cable of a sensor. The cover section and the collar section jointly form a receptacle receiving the connection end. An interior surface of the receptacle has a semi-conductive material. A connector seal is formed on the interior surface of the receptacle and a cable seal is formed in the through-hole.

BRIEF DESCRIPTION OF THE DRAWINGS

Exemplary embodiments of the invention are described by way of the following drawings. In the drawings.

DETAILED DESCRIPTION OF THE EMBODIMENTS

Figure 1:
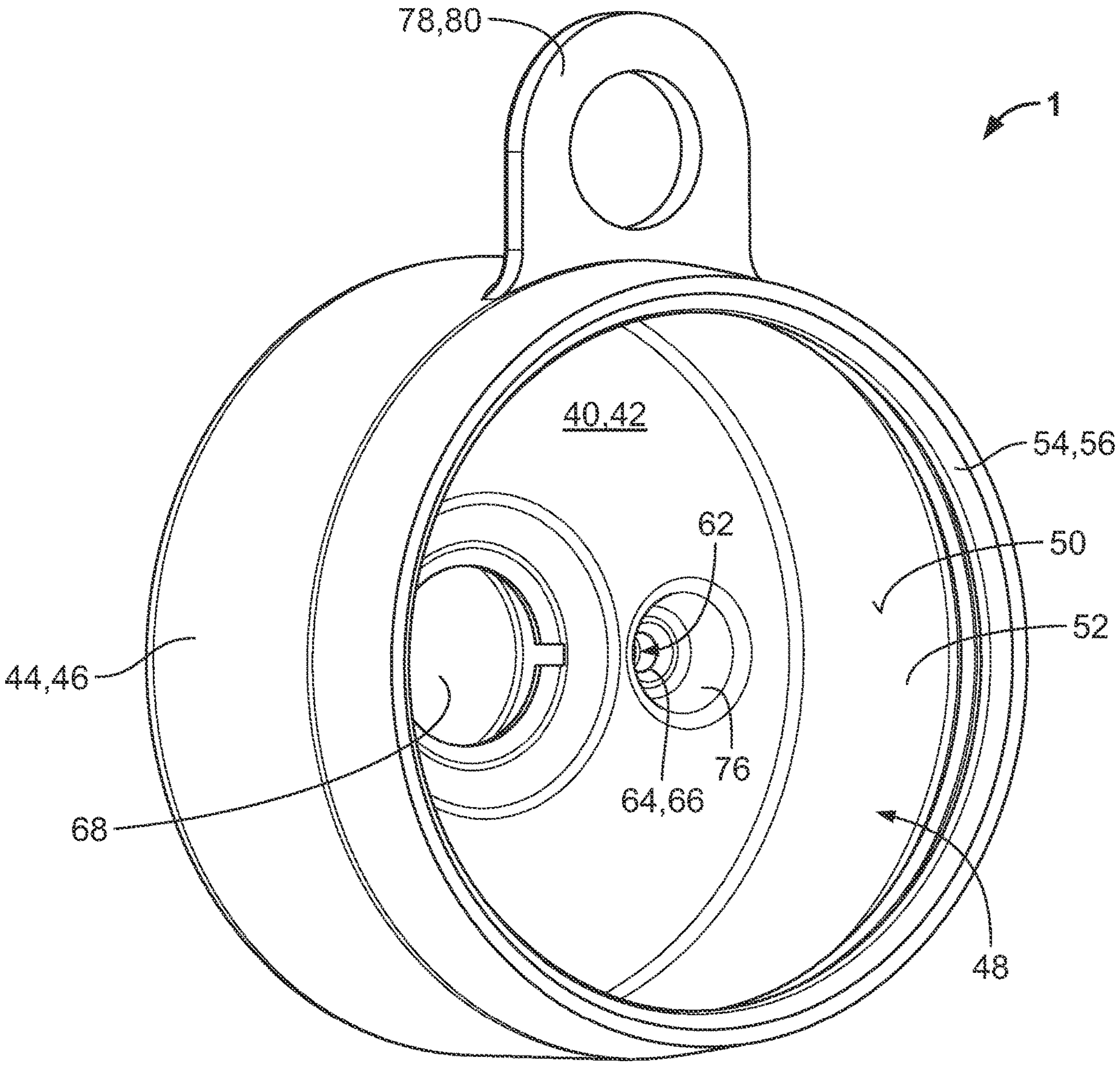
FIG. 1 is a perspective view of an outer end cap according to one possible embodiment of the present disclosure.

In the following, exemplary embodiments of the invention are described with reference to the drawings. The shown and described embodiments are for explanatory purposes only. The combination of features shown in the embodiments may be changed. For example, a feature which is not shown in an embodiment may be added as described below if the technical effect associated with this feature is beneficial for a particular application. Vice versa, a feature shown as part of an embodiment may be omitted if the technical effect associated with this feature is not needed in a particular application. In the drawings, elements that correspond to each other with respect to function and/or structure have been provided with the same reference numeral. Any reference to standards made in the present disclosure (e.g. IEEE standard, etc.) is to be understood as referring to the current standards at the time of filing.

Figure 3:
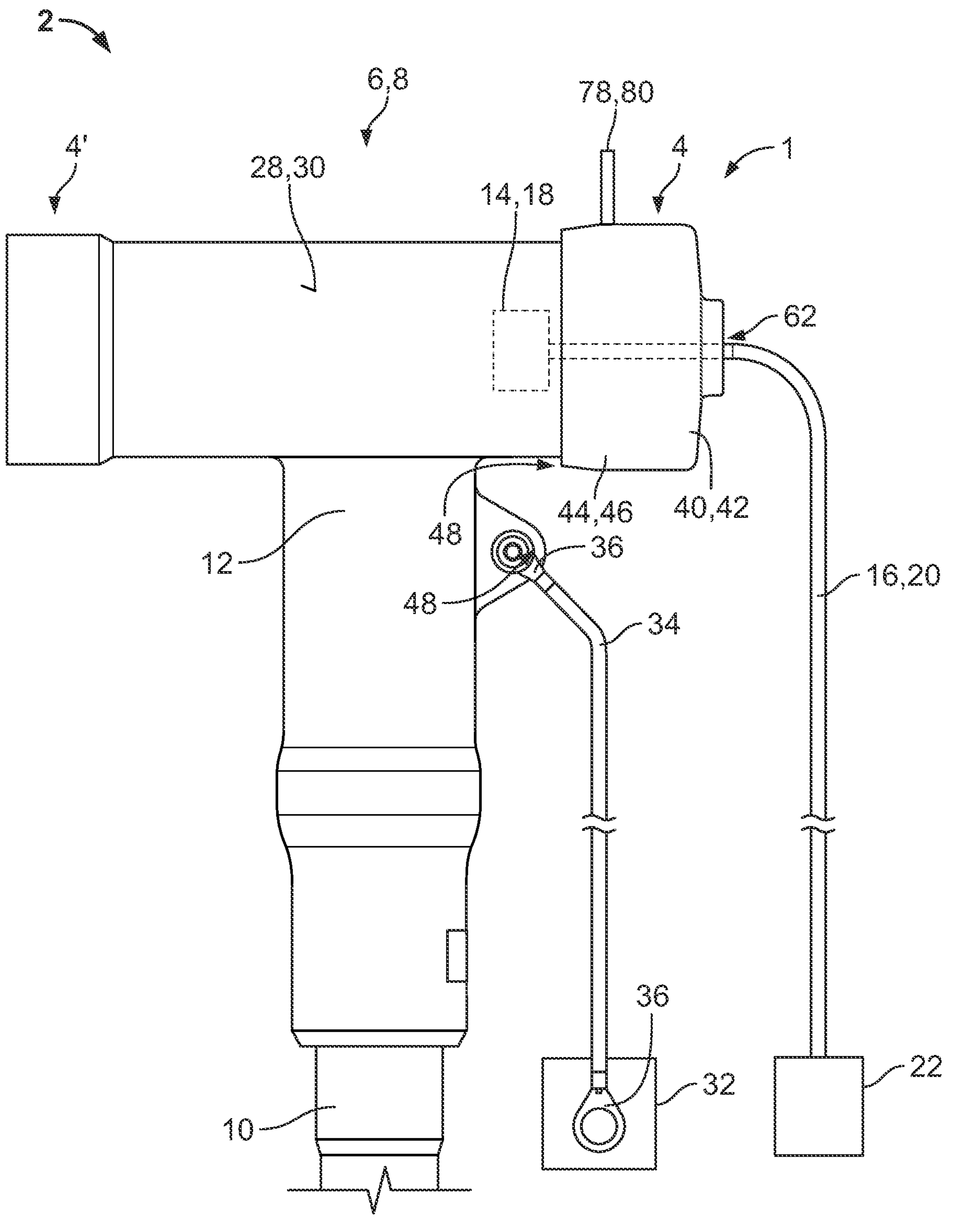
FIG. 3 is a side view of a connector assembly according to one possible embodiment of the present disclosure.
Figure 4:
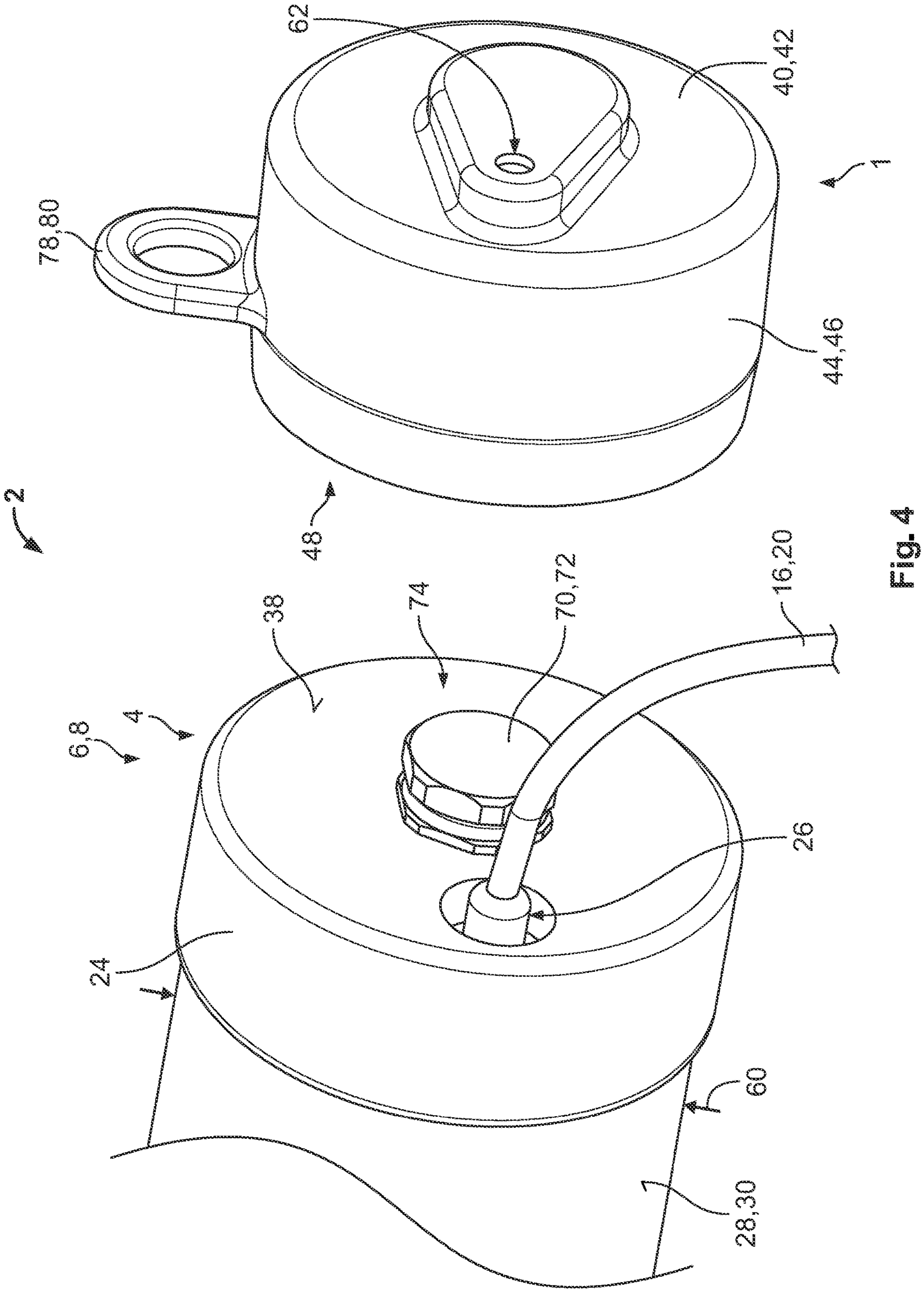
FIG. 4 is a partially exploded, perspective view of a detail of the connector assembly according to the embodiment shown in FIG. 3.
Figure 5:
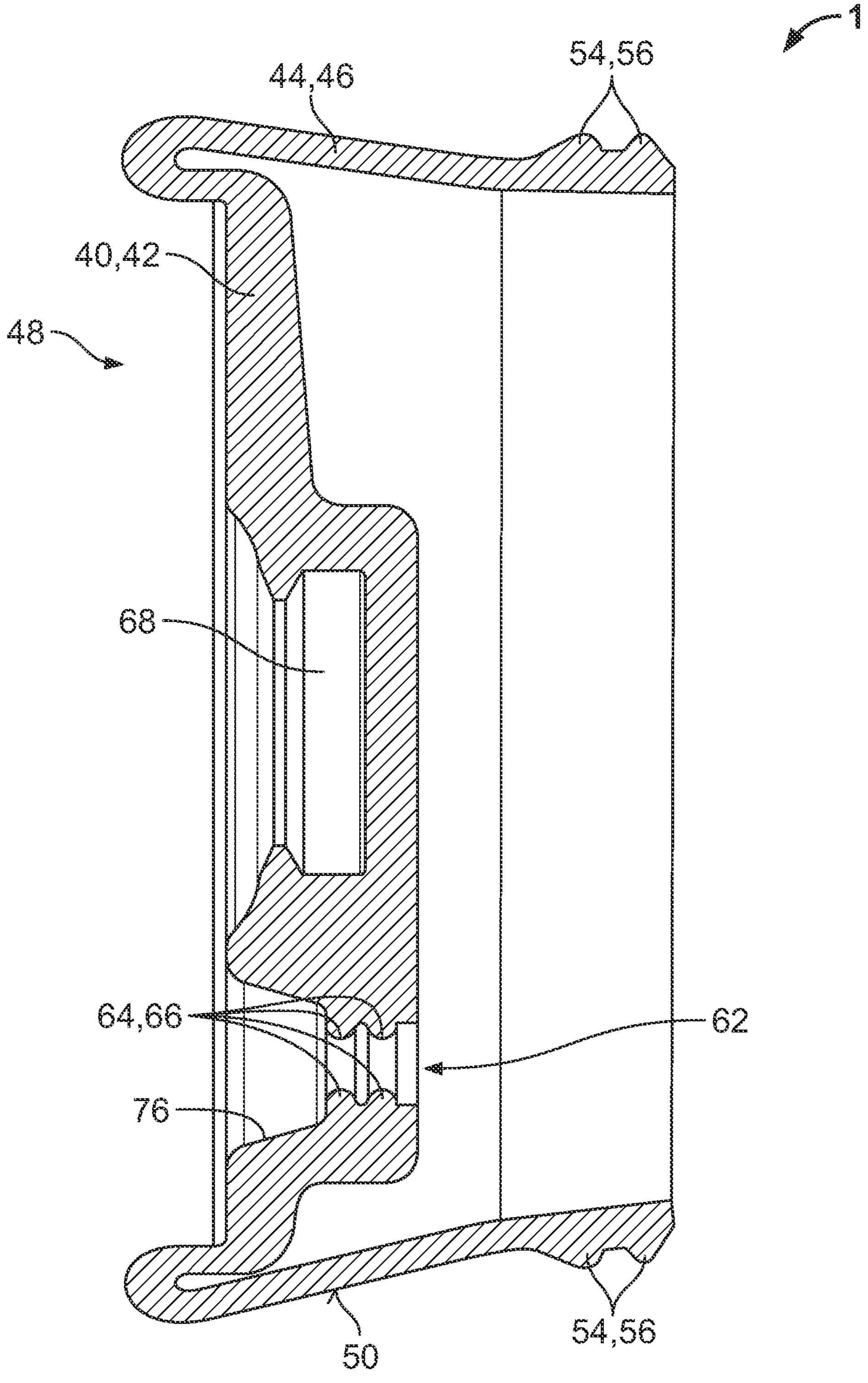
FIG. 5 is a sectional view of the outer end cap according to the embodiment shown in FIG. 1.

In the following, the structure of an exemplary embodiment of an outer end cap 1 according to the present invention is explained with reference to FIGS. 1, 2 and 5. FIGS. 3 and 4 are used to explain the structure of an exemplary embodiment of a connector assembly 2 according to the present invention.

FIG. 1 shows a perspective view of the outer end cap 1. The outer end cap 1 is used for sealing connection end 4 of an electrical connector 6, in particular a tee connector 8. Such a tee connector 8 is shown in FIG. 3 as part of the connector assembly 2. There, the outer end cap 1 is installed to the connection end 4 of the tee connector 8.

Tee connector 8 serves for coupling a power source of high-voltage or medium-voltage with a load via an electrical cable 10. As can be seen in FIG. 3, the tee connector 8 has a characteristic structure in the shape of the capital letter "T". In particular, the tee connector 8 comprises two connection ends 4, 4' facing away from each other in opposite directions. The electrical cable 10 is attached to a middle section 12 of the tee connector 8. The middle section 12 is arranged between the two connection ends 4, 4' and protrudes perpendicularly away therefrom.

One connection end 4' can be coupled to the power source. At the opposite connection end 4, a further tee connector can optionally be coupled. Otherwise, the opposite connection end 4 needs to be sealed by the outer end cap 1 as shown in FIG. 3.

As is indicated in FIG. 3, the tee connector 8 includes a sensor 14 with at least one sensor cable 16. The sensor 14 may be a voltage sensor 18. Alternatively or additionally, the built-in sensor 14 may be a current sensor and/or a temperature sensor. The at least one sensor cable 16 may be a screened cable 20 extending from the connection end 4 of the tee connector 8 and leading to a process control system 22.

The tee connector 8 comprises an inner insulating plug 24 that is attached to the connection end 4 of the tee connector 8 (see FIG. 4). The built-in sensor 14 is integrated into the inner insulating plug 24. The inner insulating plug 24 is not necessarily waterproof. Therefore, the outer end cap 1 is used to seal the inner insulating plug 24 against the ingress of water. This will be described further below.

As can be seen in FIG. 4, the at least one sensor cable 16 may comprise a sensor connector 26 for connection with the built-in sensor 14. The sensor connector 26 is not necessarily waterproof. Therefore, the outer end cap 1 is used to seal the sensor connector 26 against the ingress of water. This will be described further below.

The tee connector 8 further comprises an external coating 28 made of a semi-conductive material 30. As an alternative to the external coating 28, the tee connector 8 may comprise a molded layer. Molded layers can be provided for different variants of tee connectors 8.

The external coating 28 may be applied to the middle section 12 and the connection end 4'. In an embodiment, the external coating 28 is connected to a reference earth 32 via a wire 34 with cable lugs 36 on both of its ends, as shown in FIG. 3. Alternatively, a wire without any cable lugs may be used, wherein wire ends are bent around a grounding eye on the tee connector and the reference earth, respectively.

Further, the external coating 28 may be applied to the connection end 4 except for an end face 38 of the connection end 4. In other words, the end face 38 may be left bare without the external coating 28 (see FIG. 4).

As is shown in FIG. 1, the outer end cap 1 comprises a cover section 40 for covering the end face 38 of the connection end 4. Said cover section 40 may be formed by a substantially flat segment 42 of the outer end cap 1. In particular, said cover section 40 may have a shape complementary to the shape of the end face 38.

Further, the outer end cap 1 comprises a collar section 44 for clinging to the connection end 4. Said collar section 44 may be formed by a substantially hollow-cylindrical segment 46 of the outer end cap 1. In particular, the collar section 44 may be monolithically connected with the cover section 40.

Figure 2:
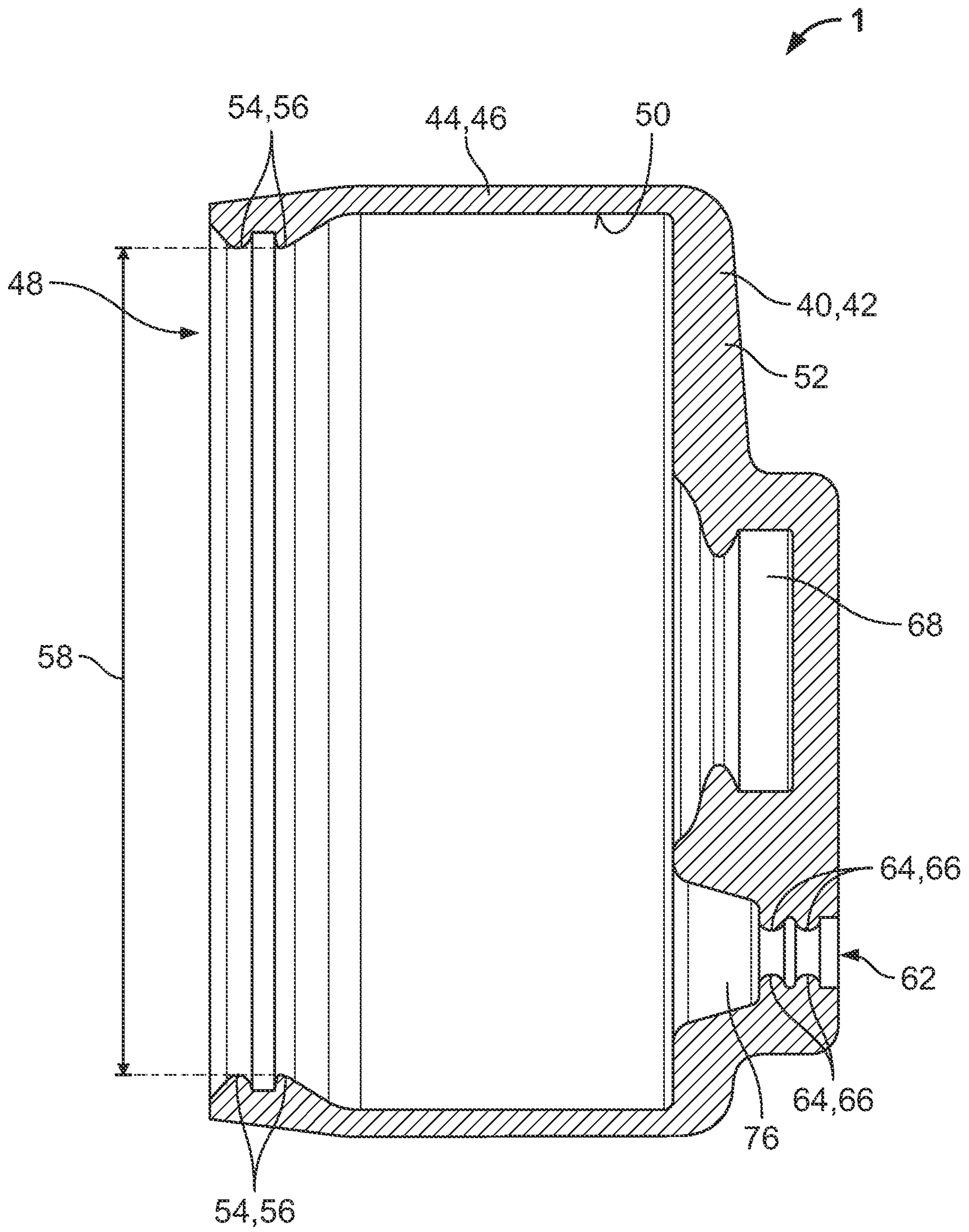
FIG. 2 is a sectional side view of the outer end cap according to the embodiment shown in FIG. 1.

As can be seen best in the sectional view of FIG. 2, the cover section 40 and the collar section 44 jointly form a receptacle 48 for receiving the connection end 4. The receptacle 48 may be shaped complementarily to the connection end 4 of the tee connector 8.

An interior surface 50 of the receptacle 48 comprises a semi-conductive material 52. The semi-conductive material 52 may be the same as the semi-conductive material 30 or different. In an embodiment, the semi-conductive material 52 is elastomeric and can fit a wide range of tee connectors with varying interfaces and connection end diameters. In particular, the semi-conductive material 52 may be a liquid silicon rubber containing carbon black particles or ethylene propylene diene monomer rubber containing carbon black particles. The volume resistivity of the semi conductive material may be smaller than 150 ohm centimetre.

For example, the receptacle 48 may be lined with the semi-conductive material 52. That is, the receptacle 48 may be internally coated, for example entirely with the semi-conductive material 52. Thereby, continuous screening is achieved by using only a minimal amount of the semi-conductive material 52. Alternatively, the receptacle 48 may also consist of the semi-conductive material 52. Optionally, the entire outer end cap 1 may be made of the semi-conductive material 52. This embodiment exhibits maximum shielding effectivity, since the outer end cap 1 serves as a screen with its entire wall thickness.

A connector seal 54 is formed on the interior surface 50 of the receptacle 48. With help of the connector seal 54, a space between the collar section 44 and the connection end 4 can be sealed. In other words, the connector seal 54 may be configured for closing the space between the collar section 44 and the connection end 4. In the shown embodiment of FIG. 2, the connector seal 54 is formed by a first set of inwardly facing sealing lips 56 at the collar section 44. Of course, it is possible to implement the connector seal 54 by a single inwardly facing sealing lip as well. Alternatively, no sealing lips at all may be provided and the connector seal may be formed by a flat section of the interior surface.

The connector seal 54, in particular the first set of inwardly facing sealing lips 56 is made of the semi-conductive material 52. Alternatively, only a layer of the semi-conductive material 52 may be arranged at the connector seal 54. In particular, the semi-conductive material 52 may form only an outermost layer of the connector seal 54; thereby, the normal force required for tight sealing can also be utilized as the normal force required for screen contact described herein. Said layer of the semi-conductive material 52 may be applied as a coating. Further, the layer of the semi-conductive material 52 may be elastic. In other words, a deformation of the connector seal 54 within its linear elastic range does not cause the layer of the semi-conductive material 52 to crumble or otherwise lose its integrity. In particular, the limit of proportionality of the layer of the semi-conductive material is beyond the elastic limit of the connector seal.

A compact structure of the outer end cap 1 can be obtained when the connector seal 54 is made of the semi-conductive material 52. Thereby, the double function of establishing sealing and screen continuity can be fulfilled by the connector seal 54. Additionally or alternatively, the cable seal 64 may be made of the semi-conductive material.

When installed to the connection end 4, the outer end cap 1, in particular, the collar section 44, more precisely the connector seal 54, may press-fittingly engage with the connection end 4. That is, an inner diameter 58 of the connector seal 54 may be smaller than an outer diameter 60 of the connection end 4. The inner diameter 58 of the connector seal 54 may be up to 3%, alternatively 3 to 5%, and further alternatively 5 to 8% smaller than an outer diameter 60 of the connection end 4. The press-fit advantageously exerts a normal force, which improves the sealing.

In an embodiment, the resulting sealing may prevent the ingress of water up to a depth of 1 m, up to 3 m, or up to 10 m.

As can be seen in FIG. 2, the collar section 44 may be inwardly narrowing in a direction facing away from the cover section 40. That is, the inner diameter of the receptacle 48 may gradually decrease at least in a segment of the collar section 44 that is spaced apart from the cover section 40.

According to an embodiment not shown in the figures, the outer end cap 1, in particular, the collar section 44 may form-fittingly engage with the connection end 4. For example, the outer end cap 1 may be configured as a snap-on cover element.

Also when installed to the connection end 4, the outer end cap 1, in particular, the collar section 44, more precisely the connector seal 54 contacts the external coating 28 of the tee connector 8. This establishes a screen continuity between the outer end cap 1 and the external coating 28. Thus, the external coating 28 and the outer end cap 1 jointly form a continuous screen over the tee connector 8.

As can be seen in FIG. 2, the cover section 40 comprises at least one through-hole 62. The at least one through-hole 62 leads into the receptacle 48. As shown in FIG. 3, the at least one sensor cable 16 of the built-in sensor 14 is passed through the at least one through-hole 62.

In the at least one through-hole 62, a cable seal 64 is formed. By the cable seal 64, a space between the cover section 40 and the at least one sensor cable 16 of the built-in sensor 14 can be sealed. That is, the cable seal 64 may be configured for closing the space between the cover section 40 and the at least one sensor cable 16 of the built-in sensor 14. For example, the cable seal 64 is formed by a second set of inwardly facing sealing lips 66 in the at least one through-hole 62. Of course, the cable seal 64 may also be formed by a single inwardly facing sealing lip, or by a flat area.

The sealing lips of the first and second set mentioned above may have a semi-circular, elliptic, triangular, quadratic, rectangular or polygonal cross-section.

According to an embodiment not shown in the figures, the cover section 40 may comprise multiple through-holes 62, if multiple built-in sensors are integrated into the tee connector each having a sensor cable 16 of their own. The diameter and shape of the through-hole 62 may be adapted to match the type of the at least one sensor cable 16. That is, for a round cable profile, the through-hole 62 may have a circular cross-section. For a flat cable profile, the through-hole 62 may accordingly have an oblong cross-section.

The location of the through-hole 62 may be adapted to match the position of the at least one sensor cable 16. For example, if the at least one sensor cable 16 is situated centrally with respect to the connection end, the through-hole 62 may be located at the center of the outer end cap 1 as well. Alternatively, in the case of the at least one sensor cable 16 being situated eccentrically, the through-hole 62 may also be arranged off-center.

An inner diameter of the at least one through-hole 62 may be chosen to be smaller than 15 mm, smaller than 6 mm, or smaller than 4 mm. With such diameters, the size of the at least one through-hole 62 is small enough to prevent water ingress, even when miniscule sensor cables 16 are used. Further, penetration of the electrical field is avoided at typical frequencies anticipated in application such as power distribution, industry and railway.

Alternatively or additionally, when the at least one sensor cable 16 is passed through the at least one through-hole 62 of the outer end cap 1, the at least one though-hole 62 overlaps with the sensor. The sensor having a screen itself, thus shuts the at least one through-hole 62. Thereby, the electrical field cannot leak from the at least one through-hole 62.

The cable seal 64 may be made of the semi-conductive material 52. Alternatively, only a layer of the semi-conductive material 52 may be arranged at the cable seal 64. Said layer may be the outer most layer of the cable seal 64. Moreover, said layer may be applied as a coating and may be elastic. In other words, a deformation of the connector seal 54 and/or the cable seal 64 within their linear elastic range does not cause the layer of the semi-conductive material to crumble or otherwise lose its integrity. In particular, the limit of proportionality of the layer of the semi-conductive material is beyond the elastic limit of the connector seal 54 and/or the cable seal 64.

As can further be seen in FIG. 2, the receptacle 48 may form a pocket 68 adapted to receive a screw head 70 (see FIG. 4) or capacitive test point of the connection end 4 of the tee connector 8. The screw head 70 may be an outer part 72 of a metallic insert 74 used for tightening the inner insulating plug 24 at the connection end 4.

The metallic insert 74 is able to transmit screwing forces to an epoxy resin material of the inner insulating plug 24 and a fixation counterpart (e.g. threaded rod/cable lug inside of the tee connector's connector body). The capacitive test point may be located on the screw head 70 and serve as a measurement location for an external capacitive sensing device. For this purpose, the metallic insert 74 may possess a certain electrode geometry on the inside. Further, the metallic insert 74 may be connected to a sensing circuit of the sensor and can act as a grounding path and/or hold interior components (e.g. PCBs) of the sensor.

In particular, the pocket 68 may be formed in the cover section 40 of the outer end cap 1 and may exhibit a shape complementary to the shape of the screw head 70 or capacitive test point.

Moreover, the receptacle 48 may form a recess 76 adapted to receive the sensor connector 26 at least partially. In particular, said recess 76 may also be formed in the cover section 40 of the outer end cap 1 and may exhibit a shape complementary to the shape of the sensor connector 26.

The outer end cap 1, in particular the collar section 44, may be reversible. In other words, the outer end cap 1 can be turned inside-out as shown in FIG. 5. This allows the collar section 44 to be everted in order to expose the inside of the cover section 40. Subsequently, the exposed cover section 40 can be easily applied to the end face 38 of the connection end 4. In particular, the pocket 68 can be placed onto the screw head 70 and the recess 76 onto the sensor connector 26. Thereafter, the everted collar section 44 can be rolled over the connection end 4 of the tee connector 8 back into its original state (see FIG. 3). This method of installing the outer end cap 1 also prevents friction and wear at the connector seal.

Optionally, the outer end cap 1 may comprise a handling section 78 for manipulation of the outer end cap 1 with a hot-stick. In particular, the handling section 78 may form an eyelet 80, into which a tip of the hot-stick can be inserted. Thanks to the handling section 78, the outer end cap 1 can be installed on and also removed from the connection end 4 of the tee connector 8 by the hot-stick, even when the tee connector 8 is under load. This greatly facilitates the installation and removal process, since the tee connector 8 does not have to be de-energized.

The outer end cap according to this solution is advantageous, since it can be readily installed on and also removed from the connection end of the tee connector. When installed, for example in the course of retrofitting a pre-existing tee connector, the outer end cap fulfils the double function of a screen and a seal. This provides the tee connector with electromagnetic and submergibility shielding and effectively protects it from electromagnetic interference caused by or affecting the tee connector and natural disasters, such as floods.

Due to the characteristic structure of the tee connector, one connection end remains unused, either because only one tee connector is used with no further tee connector coupled thereto or because it is the connection end of the 'last' tee connector in a row of multiple tee connectors. In other words, tee connectors always have an unused connection end at their back end, which can be terminated in operation with the outer end cap and due to the removability of the outer end cap stays accessible for possible further tee connectors. The term "terminated" describes that it has to be insulated to prevent current flow through this connection end.

With the help of the connector seal, a space between the collar section and the connection end can be sealed. In other words, the connector seal may be configured for closing the space between the collar section and the connection end. Likewise, a space between the cover section and the at least one sensor cable of the sensor can be sealed by means of the cable seal. That is, the cable seal may be configured for closing the space between the cover section and the at least one sensor cable of the sensor.

Due to the semi-conductive material of the receptacle, the outer end cap can serve as a screen for the connection end. In particular, the outer end cap can contact, at the receptacle, an external coating of the tee connector, which is also made of a semi-conductive material (i.e. screen contact). This guarantees a screen continuity between the outer end cap and the external coating of the tee connector, as will be described in further detail below.

All this is achieved while the at least one sensor cable of the sensor can pass through the outer end cap, effectively making the tee connector sensored and thus monitorable. In particular, the at least one sensor cable can lead to a display, a protection device, a recording device and/or a process control system (PCS).

By simply modifying the receptacle, the outer end cap can be used on the connection end of virtually any kind of electrical connector and provide submergibility as well as electromagnetic shielding according to the principles described above.

In the resulting connector assembly, the sensor is easier to repair and maintenance, because the sensor can be removably integrated into the inner insulating plug. That is, the inner insulating plug does not have to be permanently overmolded over the sensor in order to achieve submergibility. The submergibility is provided by the connector seal of the outer end cap, as described above.

What is claimed is:

1. An outer end cap for sealing a connection end of an electrical connector, comprising:

a cover section covering an end face of the connection end, the cover section has a through-hole receiving a sensor cable of a sensor; and a collar section attached to the connection end, the cover section and the collar section jointly form a receptacle receiving the connection end, an interior surface of the receptacle has a semi-conductive material, a connector seal is formed on the interior surface of the receptacle and a cable seal is formed in the through-hole.

2. The outer end cap of claim 1, wherein a layer of the semi-conductive material is arranged at the connector seal and/or at the cable seal.

3. The outer end cap of claim 1, wherein the receptacle is lined with the semi-conductive material.

4. The outer end cap of claim 1, wherein the connector seal and/or the cable seal are made of the semi-conductive material.

5. The outer end cap of claim 1, wherein the outer end cap is formed entirely of the semi-conductive material.

6. The outer end cap of claim 1, wherein the outer end cap is reversible.

7. The outer end cap of claim 1, wherein the semi-conductive material is elastomeric.

8. The outer end cap of claim 1, wherein the semi-conductive material is a liquid silicon rubber containing carbon black particles or ethylene propylene diene monomer rubber containing carbon black particles.

9. The outer end cap of claim 1, wherein the connector seal is formed by a first inwardly facing sealing lip at the collar section.

10. The outer end cap of claim 9, wherein the cable seal is formed by a second inwardly facing sealing lip in the through-hole.

11. The outer end cap of claim 1, further comprising a handling section configured to permit manipulation of the outer end cap with a hot-stick.

12. A connector assembly, comprising:

a tee connector having a connection end and a sensor with a sensor cable, the sensor cable extends from the connection end, the tee connector has an external coating formed of a first semi-conductive material; and an outer end cap contacting the external coating and including a cover section covering an end face of the connection end and a collar section attached to the connection end, the cover section has a through-hole through which the sensor cable extends, the cover section and the collar section jointly form a receptacle receiving the connection end, an interior surface of the receptacle has a second semi-conductive material, a connector seal is formed on the interior surface of the receptacle and a cable seal is formed in the through-hole.

13. The connector assembly of claim 12, wherein the external coating is connected to a reference earth.

14. The connector assembly of claim 12, wherein the tee connector has an inner insulating plug attached to the connection end.

15. The connector assembly of claim 14, wherein the sensor is integrated into the inner insulating plug.

16. The connector assembly of claim 15, wherein the inner insulating plug is not waterproof and the outer end cap seals the inner insulating plug against ingress of water.

17. The connector assembly of claim 12, wherein the sensor cable has a sensor connector connecting with the sensor.

18. The connector assembly of claim 17, wherein the sensor connector is not waterproof and the outer end cap seals the sensor connector.

19. The connector assembly of claim 12, wherein the sensor cable is a screened cable.

* * * * *